United States Patent Office 3,302,452
Patented Feb. 7, 1967

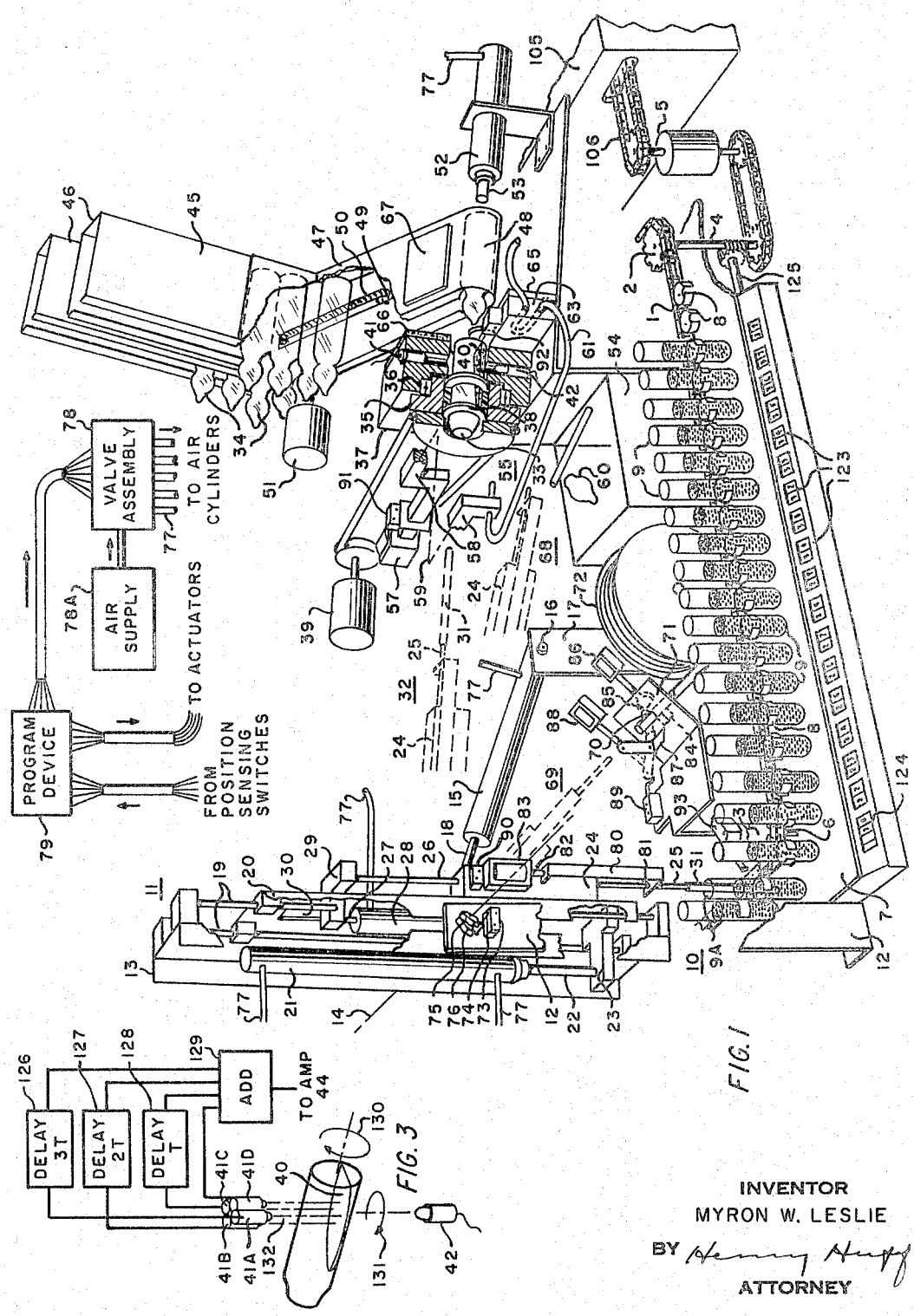

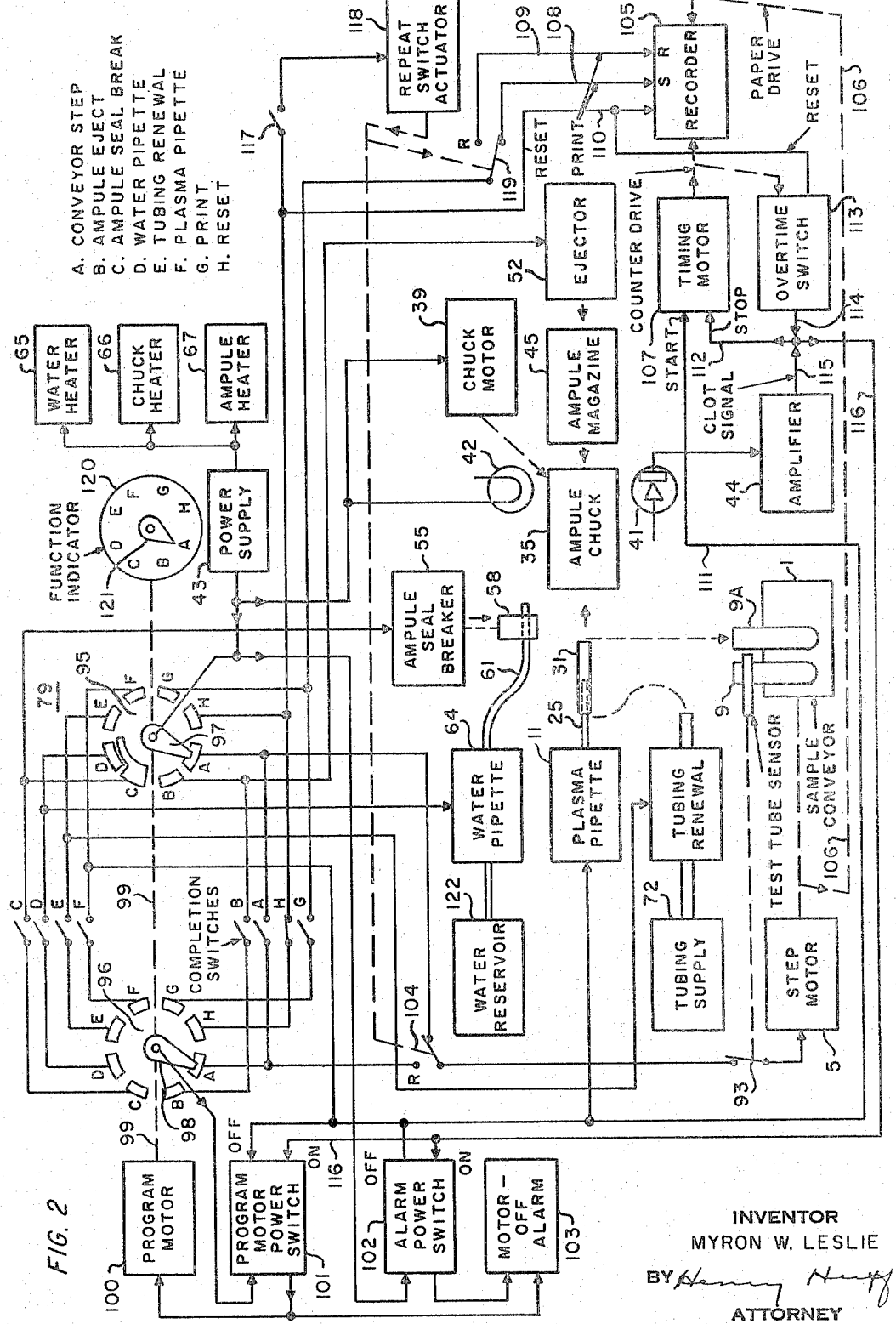

3,302,452
COAGULATION DETECTOR AND COAGULABILITY DETERMINATION
Myron W. Leslie, Westbury, N.Y., assignor to Cutler-Hammer, Inc., Milwaukee, Wis., a corporation of Delaware
Filed Apr. 27, 1964, Ser. No. 362,890
13 Claims. (Cl. 73—64.1)

This invention relates to improvements in the art of testing a fluid medium to detect the presence of an inhomogeneity such as a precipitated reaction product, and performing a desired function in response thereto; for example indicating the time required for such reaction product to appear. More particularly, the invention relates to a method of, and means for, determining the coagulability of blood samples, e.g. the time required for the appearance of a clot in a sample of plasma treated with a coagulant such as thromboplastin, in which case it would be called the prothrombin time.

Prothrombin time determinations are generally made by a laboratory technician who adds a measured amount of reagent to a measured amount of plasma and watches for the beginning of coagulation, using a stopwatch to measure the time. Normal prothrombin times range from about 12 to 16 seconds, abnormal times down to about 11 seconds and up to about 40 seconds.

Visual determination of clotting requires some judgement, because the manifestation are varied. A clot may begin to form as small threads of opaque fibrin that tend to grow and finally enmesh into a relatively solid mass. On the other hand, the initial appearance of a clot may be as a gelatinous body only moderately distinguishable from the fluid medium. Operator judgement is basically subjective, and tends to deteriorate with fatigue, emotion, and minor distractions.

Photoelectric and other systems for clot sensing have been used to minimize the need for operator skill. However, such systems generally are subject to errors caused by the variable nature of clot formation, and still require volumetric measurement of plasma and reagent and other manipulation.

The temperature history of the plasma and the reagant, both before and during the test, can affect the clotting time and if not closely controlled will introduce undesirable variations in the test results.

The principal object of the present invention is to provide improved methods and apparatus for detecting the presence or formation of inhomogeneities in an otherwise substantially homogeneous test fluid.

Another object is to provide apparatus that senses substantially only inhomogeneities of types to be sought in a test fluid, discriminating against erroneous undesired responses to variations in container walls, bubbles, etc.

Another object is to provide improved apparatus for performing a test routine on a plurality of samples in succession, identifying and maintaining the identification of each sample, and recording the results of such tests together with identifications of the respective samples.

More specifically, it is a major object of the invention to provide improved methods and apparatus for determining the coagulation times of blood plasma samples.

Another object is to minimize or prevent errors in determinations of the above type, particularly such errors as tend to result from operator judgment, loss of sample identification, measurements of quantities of plasma and reagent, variations in the mode of coagulation, pre-test and in-test temperature conditions, contamination, and plasma trauma such as may be caused by mechanical disturbances or extended preheating at normal blood temperature.

The foregoing objects are achieved in accordance with this invention by placing the fluid medium (a specific mixture of blood plasma and reagent, in the case of prothrombin determination) in a tubular reaction vessel, rotating the vessel about its longitudinal axis at an acute angle to the horizontal to form a vortex that rotates at a rate appreciably different from the rate of rotation of the vessel, and producing a response to variations near or below said vortex rotation rate, of an effect upon radiation directed at the vortex. Typically, although not necessarily, the radiation is light and the effect is an optical one, such as scattering. Light scattering may be sensed by its effect on transmission through the vortex, or on reflection from the vortex.

In a presently preferred embodiment of the invention that is particularly adapted for prothrombin determinations, disposable glass reaction vessels are used, one for each test. These vessels may be supplied containing a predetermined amount of reagent in dry powdered form, suitable for reconstitution by the addition of water. Power operated pipette devices transfer precise quantities of plasma and water (or liquid reagent, if used) to the reaction vessel which is supported in a continuous rotating chuck.

Clotting is detected by a photoelectric system incorporating means, later described, to discriminate against false indications. The plasma pipette is arranged to use disposable tubing to avoid contamination of a sample by residue of a previously tested sample. The plasma samples are loaded in standardized containers on a conveyor device which delivers them in succession to a test station. A recording device is synchronized with the conveyor and arranged to print out the test results adjacent corresponding sample identification indicia.

The plasma samples are maintained at room temperature previous to testing and until pipetted into the test vessel. The water and/or the reaction vessel are preheated to a substantially higher temperature, say 40° C., such that the mixture of plasma, water and reagent assumes a temperature of about 37° C. which is maintained during the test. In this manner the test is performed at normal blood temperature without previously keeping the plasma at that temperature, which could damage it if held for an extended period.

The invention will be described with reference to the accompanying drawings, wherein:

FIG. 1 is an illustration, partly pictorial and partly schematic, of a presently preferred embodiment of the invention in a prothrombin testing machine, FIG. 2 is a schematic block diagram of the apparatus of FIG. 1, and FIG. 3 illustrates a modified form of cloth detector that may be used in apparatus like that of FIG. 1.

Referring first to FIG. 1, a continuous conveyor 1 is shown as a chain similar to a bicycle chain and supported in a generally horizontal plane by a plurality of sprockets, two of which, 2 and 3, appear in FIG. 1. Sprocket 2 is fixed on a vertical rotatable shaft 4 arranged to be driven by a motor 5. Sprocket 3 and other similar sprockets, not shown, are idlers rotatably supported on stub shafts 6 extending upward from a base plate 7.

The conveyor 1 carries a series of uniformly spaced receptacles 8 such as spring clips adapted to hold sample containers 9, which may be ordinary test tubes. The motor 5 is arranged to move the conveyor 1 in steps from right to left as viewed in FIG. 1, presenting the sample containers 9 in succession at a test station or pickup station 10, shown as currently occupied by a container 9A.

A series of numerical display devices 123 is disposed along the front edge of the base 7, each display being positionally associated with a respective location along the front portion of the conveyor 1, where the receptacles 8 are loaded with sample containers by an operator. The displays may be provided by ordinary mechanical counter assemblies, each comprising a units wheel and a tens wheel, with all of the units wheels coupled to be driven in synchronism with the conveyor by way of a shaft 125. The connections of the units wheels to the shaft 125 are made so that the number exhibited at each successive display, going from right to left in FIG. 1, is one greater than that at the preceding one. Each time the conveyor 1 moves one step, the numbers on all displays 123 increase by one unit. Thus the number associated with any particular receptacle 8 will always appear adjacent that receptacle throughout its passage to the pickup station 10. The last display, 124, represents the location just previous to the pickup station, and may include additional digit wheels to indicate a complete sample number, the others being considered as indicating only the last two digits of a complete identification number.

A sample transfer mechanism, generally designated by reference character 11, is supported above the pickup station 10 by means including a fixed upright 12 (partially broken away to show other parts of the apparatus) and another by similar upright on the other side of the structure, not shown. The mechanism 11 includes a channel shaped base member 13, mounted in bearings on the uprights for rotation about a horizontal axis 14. A pneumatically operated linear actuator 15, hereinafter referred to simply as an air cylinder, is pivotally supported at point 16 near its right end on a bracket 17. A piston rod 18 extends from the air cylinder 15 and is connected by way of a crank arm, not shown, to the base member 13 for rotating the base member between the vertical position in which it is shown in solid lines and a nearly horizontal position partially shown in dash lines in the region 32.

The base 13 carries a pair of guide rods 19 supporting a slide member 20 for longitudinal motion parallel to the base 13. An air cylinder 21 is fixed on the base 13 and its piston rod 22 is connected to the body of the slide 20 by a tongue 23 extending through a longitudinal slot in the web portion of the base 13.

A pipette 24 is fixed on the slide 20. The interior of the pipette is a cylinder terminating in a tubular nozzle 25 and containing an airtight piston provided with a piston rod 26. The rod 26 is connected to the rod 27 of an air cylinder 28 by means 29 extending through a longitudinal slot 30 in the slide 20. The air cylinder 28 is fixed to the body of the slide 20.

The pipette nozzle 25 is adapted to engage and hold frictionally a piece 31 of disposable tubing. In the illustrated position of the transfer mechanism 11, the air cylinder 15 has been actuated to place and hold the base member 13 is a vertical position, and air cylinder 21 has been actuated to move the slide 20 to its lowermost extended position, to insert the end of the tubing 31 into the sample container 9a at location 10. Air cylinder 28 has been previously actuated to drive the pipette rod 26 downward to expel air from the pipette. When the rod 26 is moved upward by actuation of air cylinder 28, a predetermined volume of test fluid (plasma, in the present example) is withdrawn from the container 9a into the tubing 31.

The volume of test fluid so withdrawn is equivalent to the displacement of the piston in the pipette cylinder, and independent of any variations or abnormalties in the inside diameter of the disposable tubing. Said volume is substantially less than the minimum capacity of any tubing piece 31, so that test fluid will not enter the nozzle 25.

After test fluid is drawn up, air cylinder 21 is actuated to raise the slide 20 to its retracted position, withdrawing the end of tubing 31 from container 9a. Then the air cylinder 15 is actuated to rotate the base 13 counterclockwise to its extreme upper position, about ten degrees below horizontal. In this position the pipette 24 is located as shown in dash lines at the region generally designated 32, with its nozzle 25 and tubing 31 directed toward the open end 33 of a reaction vessel 34 supported in a chuck 35.

The chuck 35 is rotatably supported by bearing means 36 mounted in a block 37, and has a central cylindrical opening in which a pair of longitudinally spaced resilient washers 38 are secured. The reaction vessel 34 is preferably glass ampule of the type commonly used for medical purposes, and is supported in the chuck by frictional engagement with the resilient washers 38.

The chuck 35 is arranged to be driven continuously by a motor 39 at a substantially constant speed of about ten revolutions per second. The block 37 is supported as shown to place the axis of rotation of the ampule 34 at an angle of about ten degrees to the horizontal, with the open end 33 somewhat higher than the closed end of the ampule.

During the timing portion of the operating cycle of the apparatus, the ampule 34 contains a relatively small quantity of fluid bounded principally by the cylindrical side wall of the ampule and a free upper surface 40. Rotation of the ampule drives the fluid upward at one edge of the surface 40 and downward at the other edge, causing circulation of the fluid in a vortex around a generally vertical axis extending through the surface 40 near its center of area. The vortex rotates at a substantially constant speed that depends upon the angle of inclination of the reaction vessel, and typically is about one third the vessel rotation speed. Any inhomogeneity, such as a blood clot, exhibits a greater resistance to shear than the surrounding fluid in which the vortex is formed, and consequently is urged toward the center of the vortex.

A photocell 41 and a lamp 42 are supported in the block 37 and directed toward each other through the part of the fluid surface 40 where the vortex forms. The lamp 42 is connected to a power source 43, not shown in FIG. 1 but indicated in FIG. 2. The photocell 41 is connected to an amplifier 44 (FIG. 2).

The amplifier 44 is designed in well known manner to amplify A.-C. signals of frequencies down to about two cycles per second, and to sharply reject input signals of frequencies appreciably higher than the vortex rotation frequency, about three cycles per second. Conventional low pass or band pass filter means may be included for this purpose. The rejection of such higher frequencies prevents the system from responding to variations in light intensity caused by imperfections in the glass wall of the ampule, for example, which would appear at the ampule rotation frequency of ten cycles per second, or at multiples thereof.

Returning to FIG. 1, a magazine 45 is adapted to contain a supply of disposable reaction vessels 34, e.g. ampules. In the present example, the amples 34 are supplied containing a measured amount of reagent (thromboplastin) in dry powdered form, and are sealed. The magazine 45 includes two or more generally upright guide channels 46 and a common delivery chute 47, terminating at its lower end in an ejection station 48.

A longitudinal slot 49 in the lower wall of the chute 47 extends below the region where the lower ends of guides 46 enter the chute. An endless belt 50 of resilient material is supported on pulleys disposed near the ends of the slot 49, and extends through the slot 49 to engage the sides of the ampules 34 lying in the adjacent region of the chute 47. The belt 50 is arranged to be driven continuously by a motor 51. The moving belt rotates all the ampules in contact with it in the same direction overcoming the frictional forces between adjacent ampules and between said ampules and the inner surfaces of the delivery chute 47. This prevents jamming of the ampules at the entrance to the chute.

The ampules are conveyed gravitationally for delivery, one at a time, at the ejection station 48. An air cylinder 52 is disposed as shown adjacent the ejection station, with its plunger 53 directed along the axis of the chuck 35. When the cylinder 52 is energized, the plunger 53 pushes an ampule out of the ejection station into the chuck, at the same time forcing the used ampule out of the chuck. A removable waste receptacle 54 is placed below the chuck to receive the used ampules and other refuse produced in the operation of the machine.

A seal breaker device 55 is provided to knock the tip off the ampule newly inserted in the chuck. The device 55 includes a rod 56 arranged to be moved longitudinally by a linear actuator 57 such as a solenoid electromagnet. The rod 56 carries a hook 58 of inverted U shape extending over the face of the chuck 35. A portion of the hook 58 is shown broken away and displaced, as indicated by dash line 59, to expose the chuck and the end of ampule to view. In normal position, the legs of the hook straddle the projecting tip of the unused ampule. When the actuator 57 is energized, the hook moves back, away from the viewer in FIG. 1, and the inner surface of the nearer leg strikes the sealed tip of the ampule. The ampules as supplied may be scored around the constricted region below the tip, to insure a clean break around the opening 33. The tip 60 that is broken off falls into the container 54.

The outer leg of the hook 58 carries the end of a flexible hose 61, in such manner that the end of the hose is directed at the opening 33 when the seal breaker actuator 57 reaches the end of its stroke. The hose 61 leads into a block 63 of heat conductive material, and thence to a water pipette device 64 not shown in FIG. 1 but similar to the plasma pipette. The block 63 is provided with a thermostatically controlled heater 65 designed to maintain the block and the fluid within it at a uniform predetermined temperature somewhat higher than normal blood temperature; for example at 40° C. Although the block 63 and heater 64 are shown for clarity at an appreciable distance from the exit end of the hose 61, they should be located as near thereto as feasible.

The chuck supporting block 37 is also provided with a heater 66, designed to maintain the ampule 34 within the chuck 35 at substantially blood temperature, 37° C. Another similar heater 67 is disposed on the ampule chute 47 near the delivery station 48, for preheating the ampules prior to ejection to a somewhat higher predetermined temperature, for example 40° C.

The water and ampule preheat temperatures, which may be identical as in the present example, are such that the fluid mixture in the ampule 34 contained in the chuck initially assumes the temperature of 37° C., which is maintained during the test by heater 66. The selection of preheat temperatures will be discussed more fully below.

Returning to the transfer mechanism 11, the base member 13 may be rotated by cylinder 15 to each of two positions intermediate that in which it is shown and the nearly horizontal one. In the upper intermediate position and the pipette 24 is located as shown in dash lines at the region generally designated 68, with its nozzle end extending above the waste receptacle 54. In the lower intermediate position, the pipette is located at the region designated 69, with its nozzle directed toward an aperture 70 in a plate 71 supported as shown near a tubing storage drum 72. Switches 73 and 74, mounted on the upright 12, are arranged to be actuated by respective cams 75 and 76 connected to the rotatable base member 13 when said member is in its upper and lower intermediate positions, respectively.

The various air cylinders 15, 21, 28 and 52 are provided with air hoses 77 which lead to a valve assembly 78 connected to a compressed air supply 78a. The assembly 78 comprises respective electrically operated air valves which are controlled by switches in a program device 79. The program device, as will be explained more fully below with reference to FIG. 2, commands the steps in the operation of the machine in the required sequence, and is itself controlled in part by switches that sense the current positions of the movable parts of the machine, verifying the completion of each step before the following one is initiated.

Mounted on the slide 20 adjacent the pipette 24 is a tubing kickoff device comprising a member 80 extending at its lower end across the end of the pipette, and provided with an aperture 81 through which the pipette nozzle 25 extends. The aperture 81 is large enough to slide on the nozzle, but smaller than the outside diameter of the tubing 31. The upper end of member 80 is connected to and supported by the rod 82 of a solenoid actuator 83. When the pipette assembly is in its upper intermediate position 68 and the actuator 83 is energized, member 80 is pushed to its extended position as it is shown in the region 68, forcing the used tubing piece off the end of the nozzle, from which it falls into the receptacle 54.

The aperture 70 in plate 71 receives unused tubing from the supply reel 72. A tubing clamp device comprising a fixed jaw 84 and a movable jaw 85 is disposed at the aperture 70 on the under side of plate 71. The movable jaw is connected to a solenoid actuator 86 which, when energized, forces jaw 85 toward jaw 84 to clamp the tubing near its free end.

To renew the tubing piece on the pipette nozzle, clamp actuator 86 is held energized, cylinder 15 is operated to hold the base 13 at its lower intermediate position, with the pipette in the region 69, and the cylinder 21 is operated to extend the pipette slide 20, forcing the end of the nozzle 25 into the open end of the clamped tubing. The clamp 84, 85 is then released, and cylinder 21 operated to retract the slide, withdrawing the nozzle, and with it, a length of tubing. A cutoff blade 87 pivoted on plate 71 is provided with a solenoid actuator 88. When the length of tubing has been pulled up from orifice 70, the actuator 88 is operated to swing the cutoff blade to the position shown in dash lines. A switch 89 is arranged to sense completion of the cutoff stroke.

In general, switches like the switch 89 are provided for sensing completion of each step in the operation of the machine. For example, a switch 90 detects completion of tubing kickoff; a switch 91 closes when the seal break device 55 reaches the end of its stroke. Similarly, a switch 92 detects the presence of an ampule at discharge station 48, a switch 93 senses a test tube in the sample receptacle 8 next to be presented at the pickup station 10, and other switches, not specifically identified in FIG. 1, provide corresponding "feedback" to the program device 79.

Referring to FIG. 2, certain groups of individual steps in the operation of the machine are considered as single steps, in order to simplify the description. For example, the above described series of motions involved in transferring a plasma sample from the container 9a to the ampule 34 in the chuck 35 are regarded as sub-steps of the one operation denoted "plasma pipette" in FIG. 2. Another such composite step is "tubing renewal," which consists, as described above, of a series of sub-steps. FIG. 2 is also simplified by omission of the air valves and air supply, on the assumption that the various functions indicated as performed by air cylinders in FIG. 1 could be performed by equivalent motive devices of other known types, such as solenoid actuators.

The program device 79 is shown in FIG. 2 as consisting essentially of a pair of multiple position switches 95 and 96, with their movable contact arms 97 and 98 ganged, as indicated schematically by dash line 99, to be driven together by a motor 100. With the simplifying assumption discussed above, that certain steps be regarded as sub-steps and grouped for consideration as composite single steps, the switches 95 and 96 each have eight fixed contacts, denoted by letters A through H to represent the respective functions they are associated with. The functions are listed, with their identifying letters, in the table near the corner of FIG. 2.

The function completion sensing switches are similarly identified as to the functions they are associated with, and shown in FIG. 2 between the program switches 95 and 96, although it is to be understood that they are physically located at various points throughout the machine, as explained with reference to FIG. 1. The contacts A through H of switch 95 are connected by way of the respective completion switches to the corresponding contacts of the switch 96. Contact arm 97 of switch 95 is connected to the power source 43, and arm 98 of switch 96 is connected through a further switch device 101 to the motor 100.

The device 101 is an electrically operated switch such as a relay, arranged in known manner to open the power supply circuit to the motor 100 in response to a signal applied to its "off" input terminal, and close the circuit when an impulse is applied to its "on" input terminal. A similar switch device 102 is connected between the power supply 43 and the power input terminal of an alarm device 103. The alarm device 103 also has a control input terminal connected to the power input terminal of the program motor 100. The device 103 includes means such as a lamp or buzzer for producing visual or audible alarm signal, and a relay with contacts that are held open when the relay is energized, and closed when the relay is deenergized. Said contacts carry power from the switch device 102 to the signal means. With this arrangement, the alarm is given only when switches 101 and 102 are "on" and the program motor 100 is not being energized. As will be seen, these conditions occur only when the machine has failed to complete a commanded step in its operating cycle.

The contacts A through H of switch 95 are connected as shown to the respective actuator means that perform the corresponding functions. The connections are direct, except for that between contact A and the conveyor step motor 5, which is through the arm and lower terminal of a switch 104, and thence through the tube sensing switch 93. The switch 104 is part of a means for making the machine repeat the test on each sample before proceeding to the next.

A counter-recorder device 105, of a conventional type adapted to print input data in numerical form on a recording medium such as a paper strip, is arranged as indicated by a dash line 106 to have its recording medium driven by the sample conveyor motor 5. The counter digit wheels of the printer mechanism are arranged to be driven by a timing motor 107. The recorder 105 may be provided with two printer mechanisms, positioned to print at separate locations, for example side by side, on the paper strip. Energization of a "print" input lead 108 actuates the first printer, to record the number then standing on its counter wheels. A second "print" input lead 109 is used similarly to actuate the other printer. Energization of a "reset" input lead 110 resets both counters to zero. A third printer mechanism may be coupled to the paper drive 106, to print the complete identification number associated with the tube 9a currently at the pickup station 10 (FIG. 1).

The timing motor 107 includes switching means such as a relay arranged so that energization of a "start" input lead 111 starts the motor, which will continue to run until a "stop" input lead 112 is energized. Power for operating the motor 107 may be obtained from the source 43 by way of a connection not shown in the drawing. In addition to driving the printer digit wheels of the recorder 105, the timing motor 107 also drives an overtime switch device 113, which may be simply a cam-operated switch, designed to close and energize an output lead 114 when the motor 107 has run for a predetermined length of time, for example seventy seconds. Lead 114 is connected to lead 112 for stopping the motor 107.

Output lead 115 of the amplifier 44 becomes energized when formation of a clot is detected. This lead is connected to the timing motor stop input lead 112. The timing motor stop signal, overtime or clot, is also applied to a lead 116 connected to the "on" inputs of the program motor power switch 101 and alarm power switch 102.

The reset command signal on lead 110 is obtained from contact H of program switch 95. This signal may also be applied, by closing a manually operable switch 117, to an actuator 118 designed in known manner to throw the switch 104 alternately to its upper and lower positions in response to successive reset command signals. A similar double throw switch 119 is also operated by the actuator 118, to apply the print command signal, obtained from contact G of the program switch 95, to print input lead 108 when switches 104 and 119 are in their lower positions as shown, and to print input lead 109 when switches 104 and 119 are in their upper positions, designated R. When switch 117 is left open, switches 104 and 119 remain down.

In the operation of the apparatus of FIGS. 1 and 2, suitable switches, not shown, associated with the power supply 43, are closed to energize the heaters 65, 66, 67, amplifier 44, and any other components that may require warm up. The programmer 79 is set, manually or otherwise, to position A, as indicated on a dial 120 by a pointer 121 on the shaft 99. The ampule magazine 45, tubing supply 72 and a water reservoir 122 for the water pipette 64 are loaded, and a supply of paper strip material is provided for the recorder 105.

The conveyor 1 is loaded with sample containers 9, each containing a respective sample of plasma to be tested, starting with the holder next in position to be presented at the pickup station 10. This first container will close the tube sensor switch 93. The two final digits of the identification number associated with each sample will be indicated by the respective adjacent numerical display 123. The full (e.g. four digit) number of the sample next to be presented at the pickup station 10 is shown by the display 124.

After the equipment has warmed up, the power supply 43 is switched to energize the rest of the system, including the chuck motor 39, lamp 42, and the selector arm 97 of the program switch 95 (FIG. 2). The conveyor step command signal appears at terminal A, and, assuming switch 104 in its lower position and switch 93 closed, the conveyor 1 is moved to bring a tube 9a to the pickup station and the following tube 9 into position to close the switch 93. This operation also moves the strip in the recorder 105 to a new position, and increases by unity all the counts appearing at displays 123 and 124.

Completion of the conveyor step closes completion switch A, connecting contact A of program switch 96 to contact A of switch 95, and supplying power to the program motor 100 by way of the program motor power switch 101 and the selector arm 98 of switch 96. The motor 100 rotates shaft 99 to position B, energizing contact B of switch 95 to provide the ampule eject command signal, which operates the ejector 52 to transfer an ampule from the magazine 45 to the chuck 35. The end of the ejector stroke closes completion switch B, supplying power through contact B of switch 96 to the motor 100, which moves the program shaft 99 to position C.

In similar manner, each successive operating step is commanded upon execution of the previous step, as sensed by the associated completion switch. Although the program motor 100 is disconnected from the power supply during each step, most of the steps are so momentary in nature that the motor appears to run continuously through steps A to F, inclusive.

Contact C of program switch 95 extends adjacent contact D as shown, to maintain the seal breaker arm 58 extended during water pipetting. This holds the water hose 61 in position to direct the water into the ampule in the chuck 35. The tubing renewal and plasma pipette operations each consist of a series of sub-steps, as explained with reference to FIG. 1. Although they are considered as single steps for simplicity of showing in FIG. 2, it will be apparent that each sub-step could be represented in FIG. 2 by providing appropriate additional contacts on the program switches, and corresponding additional completion switches.

The plasma pipette command signal appearing at contact F of switch 95 goes also to the "off" input terminals of the program motor power switch 101 and the alarm power switch 102, and to the start input lead 111 of the timing motor 107. This removes power from the program motor, disables the motor-off alarm 103 (which otherwise would falsely signal a malfunction) and starts the timing motor.

The clotting reaction that is to be timed begins with the transfer of plasma into the ampule in the chuck. When the start of clot formation is detected by means of the photocell 41, the amplifier 44 produces an output "clot signal" on lead 115, stopping the timing motor 107 and restoring the power supply connections through switches 101 and 102 to the program motor 100 and alarm 103. If, owing to some malfunction or error, such as an empty sample tube or an ampule defective or lacking in reagent, the clot signal fails to appear within say seventy seconds, the overtime switch 113 operates to stop the timing motor and reset the power switches 101 and 102.

In either event, clot or overtime, the program motor is reenergized through the plasma pipette completion switch F to move the program switches to position G, actuating the print mechanism in the recorder 105 to print the measured clotting time, or an indication of overtime, on the record strip adjacent the sample number. When the print completion switch G closes, the program switches are moved to position H, sending a reset command to the printer time counter mechanisms and the overtime switch 113. Completion of the reset operation is the conclusion of an operating cycle, and closure of the completion switch H energizes the program motor 100 to drive the program switches to position A for beginning another cycle.

If switch 117 is open as shown, the new operating cycle will begin with a conveyor step, presenting a new plasma container at the pickup station for test. If it is desired to have each plasma sample tested twice, switch 117 is closed, and left closed as long as the machine is to operate in the "repeat" mode. In this case, the reset command at the end of the first cycle energizes the actuator 118 to throw switches 104 and 119 upward. Switch 104 then prevents the conveyor step command signal from reaching the motor 5, and instead sends it to contact A of the program switch 96, bypassing completion switch A. The machine operates as before, but pipettes another portion of the same plasma sample instead of a new one, leaves the record strip in its former position, and prints the new time measurement adjacent the preceding one and in line with the same sample number.

On completion of the repeat cycle, the reset command throws switches 104 and 119 downward, permitting the sample conveyor and record strip to advance. The time measurement on the new sample is made as before, then repeated, and so on.

As mentioned above, the program motor 100 is momentarily disconnected from the power supply during each of the commanded operations, until the respective completion switch closes. If the motor-off alarm 103 were to operate substantially instantaneously, it would produce a signal with each step. Generally it is preferable to design the relay or equivalent means in the device 103 in known manner to operate only if the power is off for a time in excess of that normally required for the longest step to be completed.

If the machine does not complete a commanded step, the program motor 100 stops and remains stopped, with the indicator 120, 121 showing which step was last commanded, and the alarm 103 signals to call attention to the stoppage. Such a failure could be caused by malfunction of some part of the apparatus, or by a defect the material supplied it, for example, a blocked or oversized piece of tubing, or an ampule that does not break. The indicator 120, 121 shows the attendant where to find the trouble.

In this connection, it should be understood that the completion switches A through H may be, and preferably are, supplemented by other switches such as the test tube sensor switch 93, to stop the machine in the event of a failure or exhaustion of a material supply. The tube sensor switch is exemplary of such other switches, not shown, that may be arranged in obvious manner to sense the presence of an ampule in the chuck 35, and tubing on the plasma pipette nozzle, for example.

It will be apparent that the described apparatus can be used without substantial modification with empty ampules or similar reaction vessels, and with bulk reagent mixed in the water supply. In such operation, it is desirable to agitate the water-reagent mixture continuously by suitable means to maintain homogeneity. It may also be desirable to arrange the water-reagent pipette like the plasma pipette, to use disposable tubing. By providing one or more additional pipettes, the machine may be adapted in obvious manner for routines of other tests that require two or more reagents to be kept separated before being mixed in the reaction vessel.

Prothrombin time measurements are ordinarily made at the normal human blood temperature, about 37° C., because the reaction is temperature dependent and any substantial departure from the standard temperature will cause anomalous test results. Accordingly it is customary to heat the plasma and the reconstituted reagent fluid to 37° C. before mixing them, and to attempt to maintain the mixture at that temperature throughout the reaction. However, blood plasma will deteriorate appreciably as a function of time if kept outside the body at a temperature much above normal ambient room temperature, say 25° C. Perhaps this effect could be taken into account if each plasma sample were held at 37° C. for the same length of time, preferably a very short time, before testing. Usually this is not the case; when a group of samples are to be tested, they are warmed up together, and each successive test in the run is made upon a sample that has been kept warm about a minute or more longer than the previous one. If only a single sample is warmed up at a time in some manner involving handling by an operator, the time is likely to be so loosely controlled as to affect the reliability of the test.

In similar manner, time and temperature variations in the reconstitution, warmup and pre-test holding time will affect the activity of the reagent and thus the reaction time. Ideally the reagent should be handled so as to have a time and temperature history that is always the same through reconstitution and up to the moment of use.

The foregoing considerations are met in this invention by preheating the water and/or the reaction vessel to a temperature or temperatures such that the addition of the plasma sample at a suitably lower temperature causes the mixture and the reaction vessel to assume the desired normal blood temperature. The selection of preheat temperatures is illustrated by the following example. Denoting the heat capacity (mass times specific heat) of the plasma sample drawn up by the pipette and transferred to the ampule as one "mass unit," the heat capacities of the water and the ampule are determined, by computation or measurement, in similar mass units. In a typical case, two mass units of water are to be used and the ampule is of three mass units. The heat capacity of the dry reagent powder in the capsule is small and may be ignored. Assume the desired temperature to be 37.5° C., and the plasma temperature to be 25° C. The plasma sample is then one mass unit, 12.5° below the desired final temperature. This can be balanced by the five mass units (ampule and water) at a temperature that is one-fifth of 12.5°, i.e. 2.5°, above 37.5°, or 40° C.

If reconstituted bulk reagent is used, as mentioned above, it must be kept, like the plasma, at a relatively low temperature of the order of 25° C. prior to use, and should not be preheated. In this case three mass units (the ampule) must be preheated to such temperature as to result in the final 37.5° C. temperature when the other three mass units (plasma and reagent) at 25° C. are added. The required ampule preheat temperature is 12.5° above 37.5°, or 50° C. In practice the preheat temperature may have to be slightly higher than the calculated value, to compensate for heat loss between the time the ampule is ejected from the heated magazine and the time the fluids are placed in it. The amount of the correction may be determined experimentally. Typically it is about 2° C.

When loaded ampules are used, as in the first described mode of operation, the pre-test temperature of the plasma is not critical and need not be closely controlled, since its mass-unit contribution to the final temperature is only one-sixth of the total. If the ambient temperature is to be allowed to go above or below 25° C. by more than about 3° C., some thermostatically controlled temperature maintaining device of known type should be provided to hold the temperature of the plasma in the containers on the conveyor near 25°.

When bulk reconstituted reagent is used, both the plasma and the reagent temperature should be held within 1° or less to a standard value which is preferably about 25° but may be as high as 28°, depending partly upon how long the materials are to be held at such temperature prior to use. A temperature of 28° C. maintained for a period of eight hours will cause appreciable, but not necessarily unacceptable, deterioration of the plasma and reagent.

Although the simple lamp and photocell arrangement of FIGS. 1 and 2 operates quite satisfactorily to detect clotting in prothrombin tests, improved sensitivity and discrimination against false responses may be obtained by sensing rotation of the light obscuring or light scattering substance in the vortex, instead of merely sensing reduction in the intensity of the light reaching the detector.

Referring to FIG. 3, several (in this instance, four) photocells 41A, 41B, 41C and 41D are disposed in a cluster with their axes 132 intercepting the fluid surface 40 at respective points around the vortex center. The photocells are preferably of a type in which the light admitting window is formed as a lens to provide relatively high directivity along the photocells axis. The outputs of photocells 41A, 41B and 41C are applied through delay networks 126, 127 and 128 respectively to an adding network 129. The delay networks may be conventional R-C networks, and are designed in known manner to introduce delays of three-quarters, one-half, and one-quarter of the vortex rotation period respectively. The adding network may be a circuit of known type designed to provide an output proportional to the sum of its inputs. Photocell 41D is connected directly, with no delay, to the adding network. The output of the adding network is applied to the amplifier 44 (FIG. 2).

The operation of the arrangement of FIG. 3 is as follows: Assuming the reaction vessel to be rotating at ten revolutions per second in the direction indicated by arrow 130, the resultant vortex will rotate in the direction shown by arrow 131, at about three revolutions per second. A clot formed in the fluid will be carried around with the vortex, momentarily and in succession, reducing the amount of light reaching each of the photocells. After the clot has made one complete revolution and reduces the light at photocell 41D, producing a corresponding voltage variation in the output of the photocell, similar variations in the outputs of photocells 41A, 41B and 41C that occurred earlier and were delayed by corresponding intervals will arrive coincidentally at the adding network and reinforce each other to provide the "clot" signal. Any variations that do not affect the photocells in the specified order and at the specified intervals tend to cancel rather than reinforce each other.

I claim:
1. Apparatus for detecting the formation of a reaction product of a test fluid and a liquid reagent having a greater resistance to shear than the mixture of test fluid and reagent, comprising in combination, means for supporting a tubular reaction vessel containing the test fluid and reagent with the longitudinal axis of the vessel at an angle of about five to twenty degrees to the horizontal, means for rotating said vessel as thus supported about said axis continuously at a substantially constant speed to form a vortex in the fluid mixture contained in the reaction vessel, and means responsive to change in transmissibility of radiation along a path intercepted by the vortex to indicate the formation of such reaction product.

2. Apparatus as set forth in claim 1, wherein said last mentioned means includes a source of radiation and devices to detect radiation therefrom transmitted along said path, and an amplifier connected to receive the output of said detector, said amplifier including filter means tuned to accept signals of the frequency of rotation of the vortex and to discriminate against signals of the frequency of rotation of the reaction vessel.

3. Apparatus as set forth in claim 1, wherein said last mentioned means includes a source of radiation and detector means therefor disposed along the path from said source, said radiation detector means comprising a series of radiation responsive elements disposed at intervals in a pattern adjacent said path such that variations in transmissibility resulting from circulation of a body of reaction product in said vortex affect said elements in sequence, and delay means associated with at least certain of said elements for bringing the sequential outputs of all of said elements into substantial time coincidence, and means for additively combining said coincidental outputs to provide a resultant output in response to circulation of said body of reaction product in the vortex.

4. Apparatus as set forth in claim 1, further including
 (a) sample holding means external to said reaction vessel for holding said test fluid in preparation for testing,
 (b) means for maintaining said sample holding means and its contents at a predetermined temperature lower than the test temperature at which reaction of said test fluid and said reagent is to proceed,
 (c) reservoir means for holding a supply of liquid reagent component,
 (d) means for maintaining said reservoir means and its contents at a predetermined storage temperature,
 (e) means for transferring a predetermined quantity of said test fluid from said holding means to said reaction vessel,
 (f) means for transferring a predetermined quantity of said liquid reagent component from said reservoir means to said test vessel,
 (g) means for heating said test vessel, prior to the transfer thereto of said test fluid and liquid reagent component, to a preheat temperature higher than said test temperature, said preheat temperature being predetermined with regard to the respective temperatures and heat contents of said transferred quantities of test fluid and liquid reagent component, and the heat capacity of said test vessel, to place said test vessel and its contents at said test temperature upon transfer of said test fluid and liquid reagent component to said test vessel, and
 (h) means for maintaining said reaction vessel at said test temperature during reaction of said test fluid and said reagent.

5. The method of inspecting a sample of fluid to detect therein the presence of a relatively small quantity of material having a greater resistance to shear than said fluid, said method comprising the steps of (a) supporting a tubular container of the sample with its longitudinal axis at an acute angle to the horizontal, (b) rotating the container about its longitudinal axis at an approximately constant speed to form a vortex in the fluid having a frequency of rotation about its axis substantially less than the frequency of rotation of the container, (c) detecting variations in transmissibility of radiant energy along a path intercepted by said vortex, (d) and producing a response to such of said variations as occur at the circulation frequency of said vortex.

6. Apparatus for determining the respective prothrombin times of a series of samples of blood plasma comprising in combination:

(a) a conveyor provided with a plurality of receptacles at spaced locations along its length adapted to support plasma sample containers and movable in response to a conveyor command signal to present said receptacles successively at a pick-up station, (b) a magazine adapted to hold a supply of tubular reaction vessels and to deliver said vessels in succession at an ejection station, (c) a rotatable reaction vessel supporting chuck adjacent said ejection station for receiving a reaction vessel ejected from said magazine, (d) an ejection device responsive to an ejection command signal for ejecting a reaction vessel from said magazine into said chuck, (e) means responsive to a water command signal to transfer a predetermined quantity of water from a water reservoir to a reaction vessel contained in said chuck, (f) means including a plasma pipette responsive to a plasma pipette command signal to cause a predetermined volume of plasma to be withdrawn from a sample container located at said pickup station and into said plasma pipette, (g) means responsive to a plasma transfer command signal for causing the transfer of said predetermined volume of plasma from the plasma pipette into said reaction vessel after the water has been transferred thereto, (h) a timing device, means for starting said timing device coincidentally with the transfer of said plasma into said reaction vessel, (i) a radiation source and a radiation detector disposed one above and one below the reaction vessel contained in said chuck, (j) means responsive to the output of said radiation detector to produce a clot formation signal upon a characteristic change in said output, (k) means responsive to such a clot formation signal to stop said timing device, (l) a command signal program device adapted to produce said command signals in sequence, and (m) means for stopping said program device at the command signal for starting the timing device and for starting it upon the stopping of said timing device.

7. Apparatus according to claim 6 wherein:

(a) said magazine is adapted to operate with reaction vessels in the form of sealed ampules containing each a predetermined quantity of coagulant in dry powdered form, and wherein (b) said apparatus further includes an ampule seal breaking device responsive to a seal breaker command signal under the control of the program device to break the seal of the ampule after it has been ejected from the magazine into the chuck.

8. Apparatus according to claim 6 and which includes further:

(a) temperature controlled heater means for maintaining said chuck at a temperature of substantially 37° C., and (b) temperature controlled heater means for maintaining said water reservoir and said reaction vessel magazine at respective higher temperatures, said temperatures being determined with regard to the heat capacities of the reaction vessel and the said predetermined quantities of water and plasma transferred thereto, and the temperature of said plasma, to place the temperature of the mixture in said reaction vessel at approximately 37° C.

9. Apparatus according to claim 6, wherein there is further included:

(a) an alarm device, (b) means for actuating said alarm device upon failure to complete a commanded operation, and (c) means for continuously indicating the most recent command signal produced by said program device.

10. Apparatus according to claim 6, wherein there is included further means for disabling said conveyor command signal in alternate sequences of the operation of said program device.

11. Apparatus according to claim 6, wherein there is included further means responsive to said timing device to start said program device upon failure of a clot formation signal to appear within a predetermined interval after starting of said timing device.

12. Apparatus according to claim 6, wherein said reaction vessel chuck includes resilient means adapted to frictionally engage a reaction vessel at two longitudinally separated peripheral regions.

13. Apparatus according to claim 6, wherein said magazine includes a common delivery chute and a plurality of guide means each adapted to supply reaction vessels to said chute, said chute being provided with a longitudinally extending opening in its bottom wall below the lower ends of said guide means, pulleys disposed adjacent the ends of said opening, an endless belt of resilient material supported on said pulleys and partially extending into said opening to frictionally engage reaction vessels in said chute, and means continuously driving said belt to prevent jamming of said reaction vessels at the entrance to said chute.

References Cited by the Examiner
UNITED STATES PATENTS

| | | | |
|---|---|---|---|
| 2,531,529 | 11/1950 | Price | 250—218 |
| 2,879,141 | 3/1959 | Skeegs. | |
| 3,020,748 | 2/1962 | Marshall et al. | 73—53 |
| 3,193,359 | 6/1965 | Baruch et al. | 23—259 |
| 3,219,416 | 11/1965 | Natelson | 23—259 X |

References Cited by the Applicant
UNITED STATES PATENTS

| | | |
|---|---|---|
| 2,192,568 | 5/1940 | Weathers. |
| 2,478,785 | 8/1949 | Shapiro. |
| 2,616,796 | 11/1952 | Schilling et al. |
| 2,878,715 | 3/1959 | Rhees. |

DAVID SCHONBERG, *Primary Examiner.*